Feb. 19, 1929.
R. J. DOGNAUX
1,702,501
MEANS FOR THE CONTINUOUS DRAWING OF A
PLURALITY OF BULB EDGED GLASS SHEETS
Filed Jan. 21, 1928    2 Sheets-Sheet 1
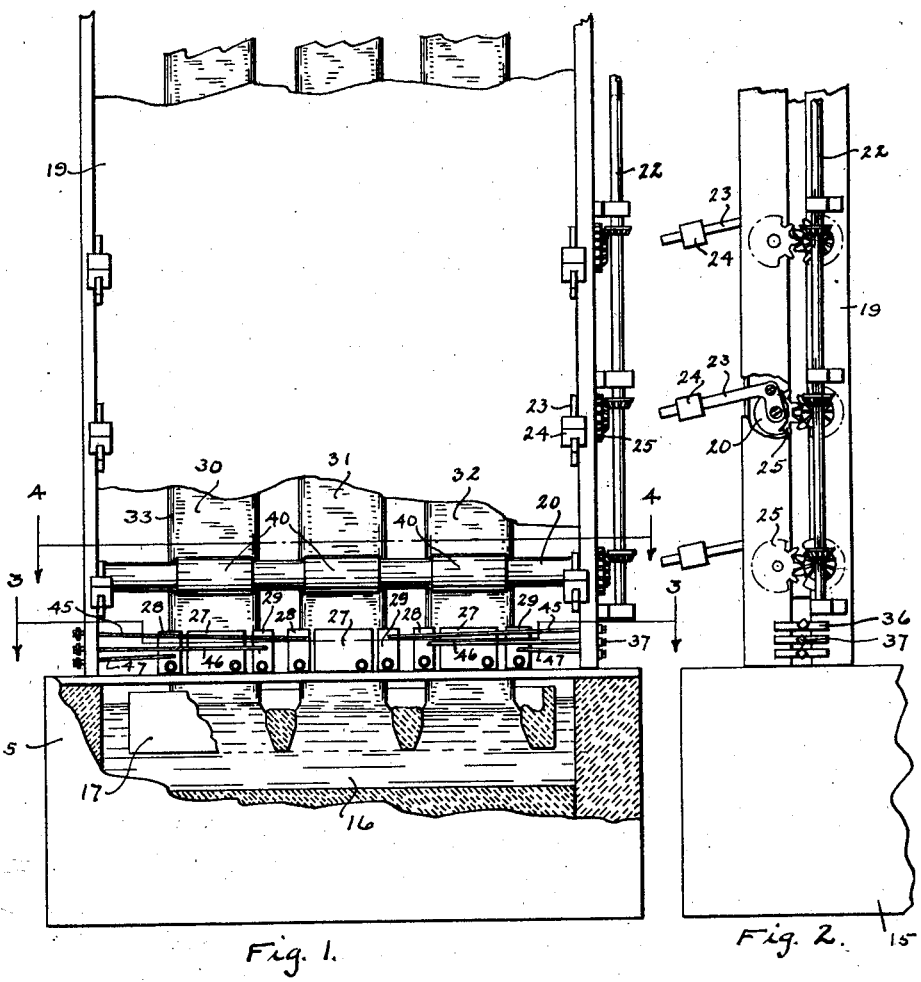
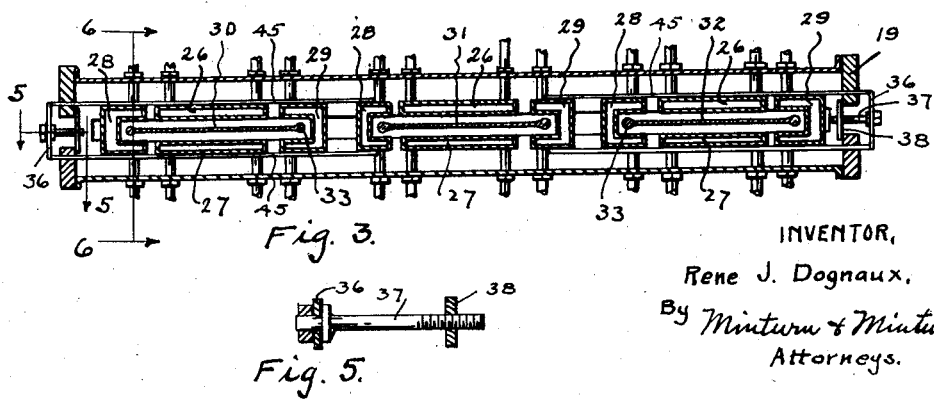
INVENTOR,
Rene J. Dognaux.
By Minturn & Minturn,
Attorneys.

INVENTOR,
Rene J. Dognaux,
By Minturn & Minturn,
Attorneys.

Patented Feb. 19, 1929.

1,702,501

UNITED STATES PATENT OFFICE.

RENE J. DOGNAUX OF VINCENNES, INDIANA, ASSIGNOR TO BLACKFORD WINDOW GLASS COMPANY, OF VINCENNES, INDIANA, A CORPORATION OF INDIANA.

MEANS FOR THE CONTINUOUS DRAWING OF A PLURALITY OF BULB-EDGED GLASS SHEETS.

Application filed January 21, 1928. Serial No. 248,380.

This invention relates to means for continuously drawing a plurality of sheets of glass directly from molten glass, and has for one of its purposes the provision and regulation of cooling means whereby each of the sheets is drawn with perfect and straight knurled or bulb longitudinal edges. One particular form of the invention is described in reference to the accompanying drawings, in which—

Fig. 1, is a fragmentary front elevation of the drawing device;

Fig. 2, is a side elevation of the device;

Figure 6:
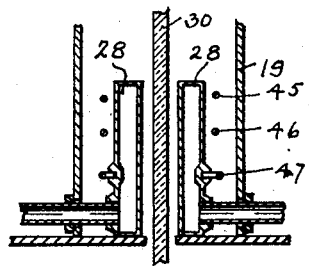
Figure 4:
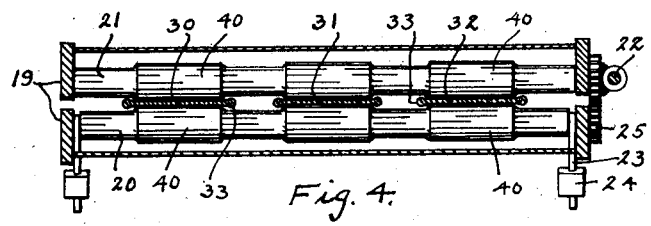
Figure 7:
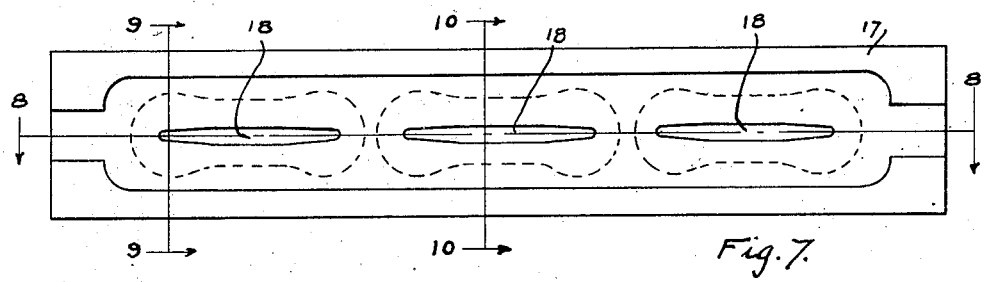
Figure 8:
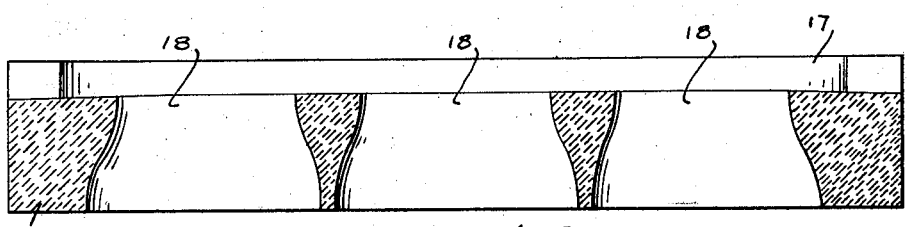
Figure 9:
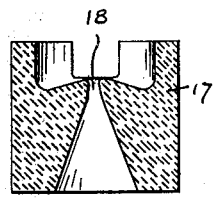

Fig. 3, a section on the line 3—3 in Fig. 1;

Fig. 4, a section on the line 4—4 in Fig. 1;

Fig. 5, a section on the line 5—5 in Fig. 3;

Fig. 6, a vertical section on the line 6—6 in Fig. 3;

Fig. 7, a top plan view of the "debiteuse" or floater block;

Fig. 8, a longitudinal vertical section through the block on the line 8—8 in Fig. 7;

Fig. 9, a transverse vertical section on the line 9—9 in Fig. 7; and

Figure 10:
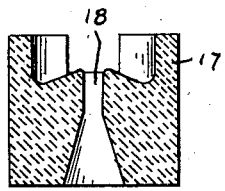

Fig. 10, a transverse vertical section on the line 10—10 in Fig. 7.

Like characters of reference indicate like parts throughout the several views in the drawings—

In the drawing chamber 15 in one end of a glass tank, is held in the molten glass 16, a "debiteuse" or floater block 17 in the usual manner as heretofore required in drawing a single sheet of glass, the means of depressing and retaining the block 17 in a fixed position being well known to those versed in the art, and the exact details of which are not a part of this invention.

In place of the heretofore single slot through the block 17, I form the block 17 with a plurality of slots 18 therethrough, here shown as three in number, and the block 17 is depressed sufficiently in the molten glass to cause the molten glass to tend to flow upwardly through each of these slots 18.

Immediately above the drawing chamber is mounted a tower-like structure 19 in which is carried a plurality of pairs of rollers 20 and 21, the pairs being spaced apart at intervals from the bottom to the top of the tower. The back rollers 21 are each mounted in fixed bearings to be revolved through bevel gearing from the vertical shaft 22. The forward rollers 20, are mounted in bearings in the lower ends of the bell-crank levers 23 in such manner that weights 24 on the outer ends of the bell cranks tend to rock the rollers back toward and against the rear rollers 21, the rollers 20 being revolved through spur gears 25 meshed with the spur gears on the ends of the rollers 21.

The molten glass 16 is brought to the proper temperature in the chamber 15 whereby it may be drawn up through each slot 18 to pass between coolers 26, 27, 28, and 29 to become solidified and form the sheets 30, 31, and 32, thence between each pair of rollers 20 and 21. The rollers 20 and 21 revolve continuously and due to the pressure of the rollers 20 carrying the sheets against the rollers 21, sufficient friction is exerted on the sheets pressed therebetween to carry them upwardly so that the molten glass below is continuously drawn up through the slots 18.

Other factors being constant, the rate of speed of the rollers 20 and 21 determines the thickness of the sheets of glass drawn, but the longitudinal edges of the sheets may be varied in thickness by the rate of cooling.

Reference is made to Fig. 3 where the bulb edges 33 are shown formed on the sheets 30, 31 and 32 as they are coming through between the coolers. These coolers are hollow tanks through which water may be circulated as a cooling medium. The end coolers 28 and 29 about each sheet of glass are adjustably positioned and are the ones that determine the character of the glass edges by their proximity to the glass. The coolers 28 and 29 here shown are substantially U-shaped in cross section, but the legs extending along the faces of the sheets may be omitted under some circumstances and the side coolers 26 and 27 increased in length to compensate for the removal.

Pairs of rods 45, 46 and 47 extend from the respective end coolers 28 and 29 to the outer edges of the tower where they are secured to transverse bars 36 through which are rotatably retained the adjusting bolts 37 which screw-threadedly engage through the fixed plates 38. By appropriate selective rotation of the bolts 37, the desired cooler may be moved toward or away from the sheet edge to cool the edge according to the edge desired, the pipe connections to the coolers being adapted to permit such movement.

As indicated in Figs. 1 and 4, the rollers 20 and 21 are turned to have the sheet contacting faces 40, with sections of reduced diameter at each end to permit the bulb edges to pass freely between the rollers without contact so that all the pressure exerted by the rollers on the sheets is exerted across the plane surfaces.

While I have here described my invention in the one particular form as now best known to me, it is obvious that structural variations may be had without departing from the spirit of the invention, such as for example, the use of separate floater blocks placed end to end, in place of the single block here shown, and in the use of other means of adjusting the coolers, and I, therefore, do not desire to be limited to the precise form as shown and described, nor any more than may be necessitated by the following claims.

I claim:

1. In a device for drawing a plurality of sheets of glass having bulb edges from molten glass, a floater block having a plurality of slot-like openings therethrough in the same longitudinal plane, each of said openings being shaped to define a sheet of glass as the glass is carried away from the block.

2. In a device for drawing a plurality of sheets of glass having bulb edges from molten glass, a floater block having a plurality of slot-like openings therethrough in the same longitudinal plane, each of said openings being shaped to define a sheet of glass as the glass is carried away from the block and cooling means about the lateral edge of each sheet.

3. In a device for drawing a plurality of sheets of glass having bulb edges from molten glass, a floater block having a plurality of slot-like openings therethrough in the same longitudinal plane, each of said openings being shaped to define a sheet of glass as the glass is carried away from the block and cooling means about the lateral edge of each sheet, said means being adjustable to selectively cool said sheet edges.

In testimony whereof I affix my signature.

RENE J. DOGNAUX.